United States Patent [19]

Ito et al.

[11] 4,379,283
[45] Apr. 5, 1983

[54] TYPE FONT OPTICAL CHARACTER RECOGNITION SYSTEM

[75] Inventors: Koji Ito; Akira Kondo, both of Yokohama, Japan

[73] Assignee: Toyo Keiki Company Limited, Tokyo, Japan

[21] Appl. No.: 229,996

[22] Filed: Jan. 30, 1981

[30] Foreign Application Priority Data

Feb. 5, 1980 [JP] Japan .................................. 55-12601

[51] Int. Cl.³ .............................................. G06K 9/46
[52] U.S. Cl. ........................................ 382/18; 382/27; 382/41
[58] Field of Search ............... 340/146.3 R, 146.3 FT, 340/146.3 Y, 146.3 MA, 146.3 AL; 364/515

[56] References Cited

U.S. PATENT DOCUMENTS

| | | | |
|---|---|---|---|
| 3,522,586 | 8/1970 | Kiji et al. .................. | 340/146.3 MA |
| 3,634,822 | 1/1972 | Chow ........................ | 340/146.3 FT |
| 3,634,823 | 1/1972 | Dietrich et al. .......... | 340/146.3 MA |
| 3,805,239 | 4/1974 | Watanabe .................. | 340/146.3 MA |
| 3,831,146 | 8/1974 | Rundle ........................ | 340/146.3 Y |
| 4,274,079 | 6/1981 | Todd et al. ................ | 340/146.3 FT |
| 4,288,779 | 9/1981 | Otsu et al. .................... | 340/146.3 Y |

*Primary Examiner*—Leo H. Boudreau
*Attorney, Agent, or Firm*—Fleit, Jacobson & Cohn

[57] ABSTRACT

Stored in a two-dimensional memory is a read-in character information of one character which was scanned by an optical scanner and digitized into character digital bits and background digital bits. The character information on the storage plane of the memory is divided into a plurality of segments using 4×4 bit meshes as a unit and the number of the character digital bit meshes included in each of the segments is counted. A collection of segment information obtained from these count values is used as an input information and is compared by pattern matching with each of a collection of standard character information preliminarily prepared for a set of characters in the same information form as the input information, thereby effecting the desired type font character recognition.

10 Claims, 10 Drawing Figures

TYPE FONT OPTICAL CHARACTER RECOGNITION SYSTEM

BACKGROUND OF THE INVENTION

The present invention relates to type font optical character recognition systems, and more particularly the invention relates to an improved type font oriented system so designed that a character information read by an optical scanner is compared by a pattern matching technique with each of a separately prepared set of standard character information to recognize the character read.

With printed character recognition systems heretofore known in the art, in order to eliminate any spots, voids and concavity and convexity variations in the stroke edges which are peculiar to printed characters, it has been essential to provide a preprocessing device adapted to perform the function of eliminating spots, filling in voids, smoothing out the stroke edges, etc., and this has imposed a considerable burden on the cost and the recognition rate of the systems.

As a simple read-in or input character recognition technique for the above type of systems, an input character recognition method has been proposed which comprises storing an input character information as a binary-coded data, quantizing the data by dividing it on the two-dimensional meshes of the storage plane of the memory into a plurality of segments each including an area of the same number of meshes, counting for each of the segments the number of the meshes containing the character digital data to obtain an input information in the form of a collection of a series of segment information, and recognizing the input character by performing the calculation of correlation distance or the process of pattern matching through a comparison between the corresponding segment information of the input information and each of a plurality of standard character information prepared preliminarily in the same information form as the input information, and there has existed a need for the realization of a specific system for performing the method. In this case, the number of the prepared standard character information for the pattern matching purposes is equal to the number of different characters to be recognized and the number is generally large. Thus, from the system cost point of view it is recommended to store them in an ROM (read-only memory). In consideration of the large quantity of the standard character information used, the efficient utilization of the memory capacity of the ROM to the fullest extent in turn results in a decrease in the memory capacity, and the simplification of the addressing method of the ROM is important in increasing the rate of character recognition in the systems.

SUMMARY OF THE INVENTION

It is a principal object of the present invention to provide an improved type font optical character recognition system in which the memory capacity of an ROM storing a set of standard character information for pattern matching purposes is utilized efficiently and the addressing of the ROM is simplified.

It is another object of the present invention to provide such system which eliminates the use of such preliminary process as usually required at the preceding stage of the input character recognition process in the known system of this type.

Thus, in accordance with one form of this invention there is provided a type font optical character recognition system comprising optical scanner means for optically scanning each of the characters printed on a paper to generate a read-in or input character information digitized into background digital bits corresponding to the paper white background area and character digital bits corresponding to the black character area, first memory means for temporarily storing the input character information from the optical scanner means, location normalizing means for normalizing the location of the area occupied by each of the read character information on the two-dimensional meshes of the storage plane of the first memory means, counting means for dividing the normalized input character information on the storage plane into a plurality of segments each including an area of the same number of 4×4 bit meshes and counting for each of the segments the number of the meshes containing the character digital bits and generating as a segment information, subtracting means for decreasing 1 from the count value of each of the segment information when the count value is greater than 1, second memory means for temporarily storing as an input information a collection of the segment information for one character from the subtracting means, third memory means preliminarily storing permanently a standard character information set corresponding to a plurality of characters in the same segment information form as that of the input information, matching process means for performing the operation of pattern matching on the input information and each member of the standard character information set, and decision means responsive to the results of the pattern matching operation to recognize the character read by the scanner by means of the most matched member of the standard character information set or to reject the character.

In accordance with the present invention, a system with a high memory utilization efficiency is realized by virtue of the quantization of the ISO specified size-I type font of OCR printed characters into discrete values of 0.1 mm width. In accordance with the invention the unit information (segment information) used in the pattern matching process for recognition purposes is represented by a 4-bit binary number and its information content includes the broad-view property of the stroke width of the character.

In the third fixed memory means storing a plurality of standard character information, each of the character information comprises a collection of standard segment information, each member of which is comprised of an upper limit value and a lower limit value which are each represented by a 4-bit binary number.

Specifically, the matching process means comprises an arithmetic unit for comparing the input information with each of the plurality of standard character information to obtain the difference between each of the input segment information and the upper limit value or the lower limit value of each of the standard segment information and generate the maximum value of the resulting difference values and zero as a parameter, a function generator responsive to the parameter to generate a predetermined characteristic function, and an adder for producing the sum of the characteristic function values for all the segment information of the input character to generate a correlation distance.

In accordance with the invention, the input information is divided into a plurality of segments each composed of 4×4 meshes corresponding to the stroke width of printed characters to be recognized and the presence of any stroke width elements is grasped on the whole, thereby eliminating the use of any preliminary process for filling in any voids or smoothing out any concavities and convexities in the stroke edges which are peculiar to printed characters. When the thus obtained count value of each of the segment information set is greater than 1, the count value is decreased by 1 and in this way the elimination of any spots such as smearings on the paper is made possible. Also in accordance with the present invention the desired reduction in the capacity of a memory storing the standard character information set for pattern matching purposes is attained through the improved utilization efficiency of the memory cells and at the same time the calculation of the characteristic function is effected through the information conversion by the ROM with the resulting further increase in the processing speed.

The above and other objects, construction and functional effect of this invention will become more apparent from the following detailed description of its embodiment taken in conjunction with the accompanying drawings.

DESCRIPTION OF THE PREFERRED EMBODIMENT

Figure 1:
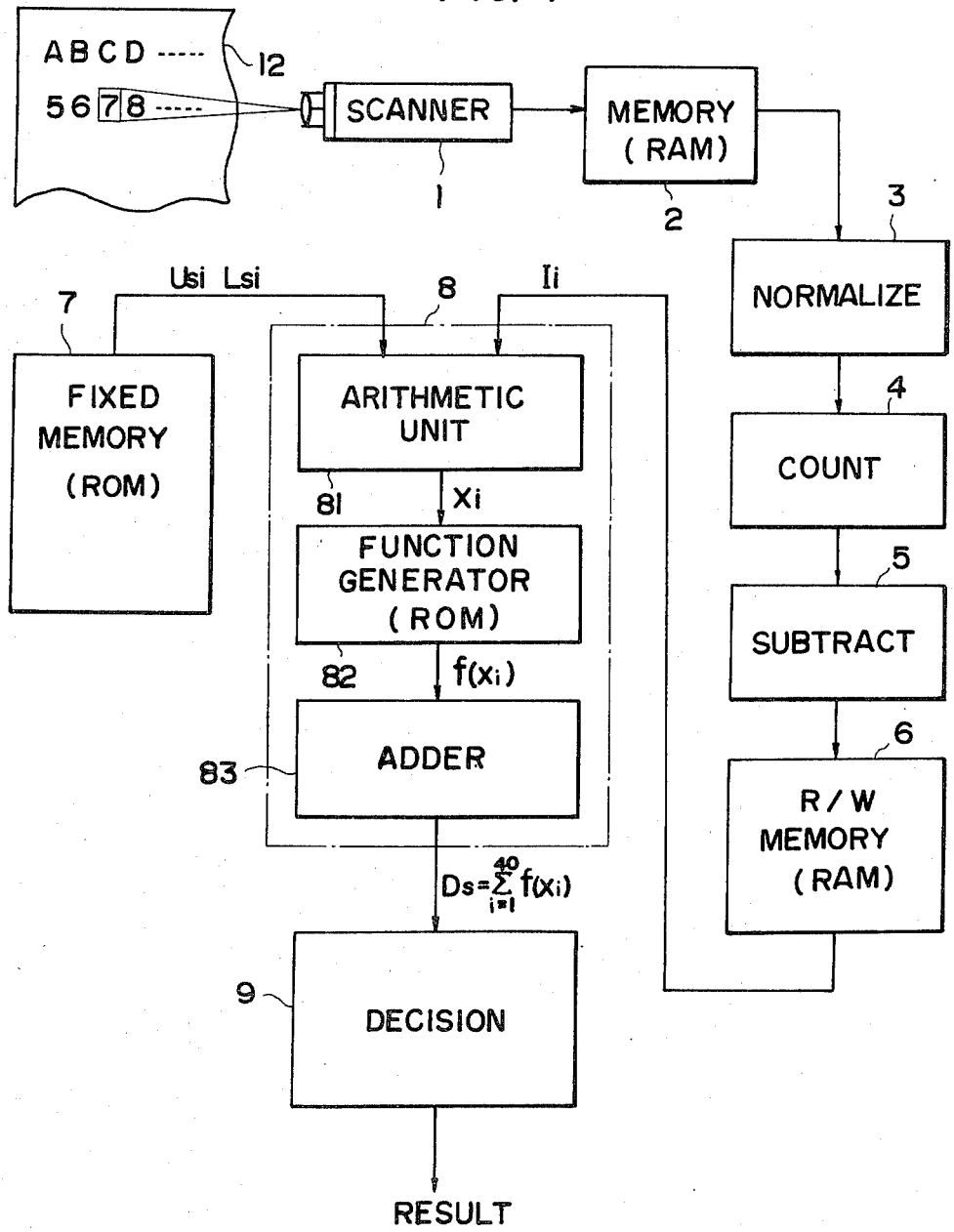
FIG. 1 is a block diagram showing the construction of a system according to an embodiment of the invention.

Referring to FIG. 1, numeral 1 designates an optical scanner for optically scanning each of the characters on a paper 12 to generate an input character information which is digitized into background digital bits corresponding to the paper white background area and character digital bits corresponding to the character black data area, 2 a buffer memory such as an RAM (random access memory) for temporarily storing sequentially the input character information from the scanner 1 one character at a time, 3 a location normalizer for normalizing the location of the area occupied by the input character information for one character on the two-dimensional meshes of the storage plane of the memory 2, 4 a counting unit whereby the normalized input character information for one character is divided on the storage plane into a plurality of segments each including an area of 4×4 meshes and the number of the meshes each containing a character digital bit is counted for each of the segments to generate the resulting count value as a segment information, 5 a subtracting unit whereby the count value of each of the segments counted by the counting unit 4 is decreased by 1 when it is greater than 1, 6 a read/write memory such as an RAM for temporarily storing the segment information from the subtracting unit 5 for one character at a time, 7 a fixed memory comprising an ROM having preliminarily stored therein the standard character information of a plurality of characters in the same segment information form as the information stored in the memory 6, 8 a matching unit for performing the operation of pattern matching on the input information in the memory 6 and each of the standard character information set in the memory 7, that is, the calculation of a correlation distance Ds between the input information and each of the standard character information set is performed as will be described later, and 9 a decision unit for performing the decision operation such that depending on whether a predetermined condition is satisfied by a decision factor such as the minimum distance value among the correlation distances between the standard character information set and the input information which were calculated by the matching unit 8 or the difference value between the minimum distance and the next minimum distance, the input character is recognized as one corresponding to that standard character information which produced the minimum distance or it is rejected otherwise. The matching unit 8 and the decision unit 9 form an essential recognition unit, and in the illustrated embodiment the matching unit 8 comprises a plurality of function parts including an arithmetic unit 81, a digital function generator 82 and an adder 83.

Figure 2:
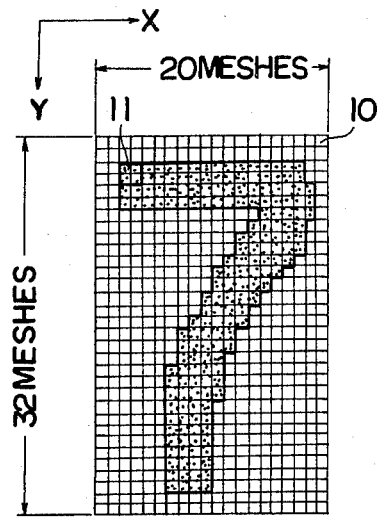
FIG. 2 is a diagram schematically showing the two-dimensional pattern on the storage plane of first memory means which read a digitized input character information.

The optical scanner 1 optically scans in for example the raster scan mode the characters on the paper 12, e.g., those of the typewriter or line printer font and generates an input character information digitized in such a manner that a black character portion is represented by a character digital bit such a "1" signal and a background white portion is represented by a background digital bit such as a "0" signal and the output is sequentially stored one character at a time in the memory 2. FIG. 2 shows schematically an exemplary two-dimensional pattern on a single-character storage plane 10 of the memory 2. In FIG. 2, the storage plane 10 comprises a two-dimensional 20×32 mesh array and each of the meshes corresponds to one bit. In the plane 10 of FIG. 2 showing that the character 7 was read into the memory 2, the black meshes represent character digital bits and the white meshes represent background digital bits.

Figure 3:
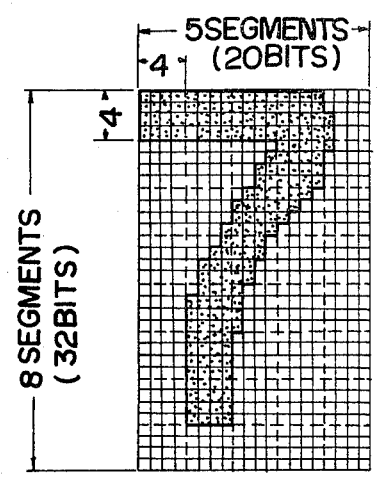
FIG. 3 is a diagram schematically showing the two-dimensional pattern subjected to location normalization and its division into 4×4 mesh segments on the storage plane.
Figure 4A:
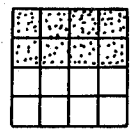
FIGS. 4a, 4b, 4c, 4d, 4e and 4f are schematic diagrams of the two-dimensional pattern showing the properties of exemplary 4×4 mesh segment information with respect to the character stroke width.
Figure 4D:
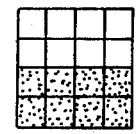
Figure 4B:
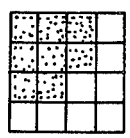
Figure 4E:
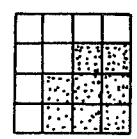
Figure 4C:
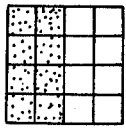
Figure 4F:
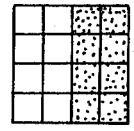

The input character information thus stored temporarily in the memory 2 is then normalized one character at a time by the location normalizer 3 such that the location of its area on the storage plane 10 is normalized so as to determine the area which is to be used as the input information in the subsequent signal processing. While this normalizing process may be any one of a variety of methods such as one by which the center of the circumscribing boundary of the character portion of the input information pattern is normalized to conform with a predetermined position or another which aligns the left end side and the upper end side of the character with predetermined reference positions, in the present embodiment the latter method is used to normalize the left end side and the upper end side of the character portion as shown in FIG. 3. More specifically, in order to prevent any end detection error due to noise resulting from the detection of the left and upper end sides, the plane 10 of FIG. 2 is scanned from the left end top in the direction X by means of a detection window of a 2×2 mesh area and this scanning is repeated while shifting in the direction Y. Thus, when a mesh location 11 in which all the data of the 2×2 meshes are "1" is detected first, that row including it is determined as the upper end side of the character portion. In the like manner, the plane 10 of FIG. 2 is scanned from the left end top in the direction Y repeatedly while shifting in the direction X, so that when a mesh location 11 in which all the data of the 2×2 meshes are "1" is detected first, that column including it is determined as the left end side of the character. It should be noted here that while, in FIG. 2, the mesh location 11 of the upper end side coincides with that of the left end side at the same position, this is no more than a mere example.

FIG. 3 shows the result obtained by detecting the upper and left end sides of the character pattern in FIG. 2 and then normalizing their positions as mentioned previously.

The input character information normalized by the location normalizer 3 is then subjected one character at a time to the counting process of the counting unit 4 on the basis of segments each corresponding to an area of 4×4 meshes of the two-dimensional mesh array on the storage plane 10, and the counting unit 4 generates for each of the segments a count value indicative of the number of the meshes each containing a character digital bit. In accordance with the OCR type font size I specified by the International Standard Organization (ISO), in terms of average values the character stroke width is 0.35 mm and the character size including the stroke width is 2.75 mm long × 1.75 mm wide. As a result, if a character of this standard size is quantized into discrete quanta of 0.1 mm wide, the stroke width of the character corresponds to an information content of 4 bits and the character size corresponds to an information content of about 28 bits long × 18 bits wide. Considering variations in the typewriting or printing quality of characters, if the storage pattern 10 of a single character capacity comprises an area of 32×20 bits as shown in FIG. 3, the storage of an input information of one character is possible for each character of the size-I type font.

It should be noted here that the character stroke width corresponds to 4 bits on an average and the size of 4×4 meshes per segment may be considered as the basic unit of the stroke width.

As a result, by counting the character digital bit indicative meshes within the 4×4 mesh segment, it is possible to use the resulting count as data for a broad-view decision as follows. In other words, this count value (segment information) may be grasped as a digitized local feature of the character as follows:

(A) If the count represents the portion formed all over the stroke width?

(B) If the count represents the portion formed over about half the stroke width?

(C) If the count represents the substantial or complete absence of stroke width element?

For the above-mentioned reasons, the counting unit 4 of this invention is designed so that the input character information normalized on the storage plane 10 of 32×20 bits per character as shown in FIG. 3, is divided on the plane 10 into 40 segments each including a 4×4 mesh area and the number of the meshes containing character digital bits is counted for each of the segments to generate a segment information.

In this case, by counting the number of the character digital bit containing meshes in each of the segments, it is possible to obtain the same count value for each of the segment information of different patterns including the black data area occupying half the stroke width as shown for example in FIGS. 4a to 4f. In other words, the count value (segment information) of each of the segments does not include any phase information which indicates the distribution of the black data portions and the previously mentioned broad-view decision data (A), (B), or (C) is obtained from each of the count values so as to make a decision on each of the 40 segment information and thereby to obtain an input information for one character in the form of a collection of these segment information.

Thus, by virtue of the fact that an input character information is converted into 40 segment information per character and these information are handle as broad-view information, it is possible to eliminate the use of preliminary process such as smoothing out the concavity and convexity variations in the character stroke edges and filling in the voids which has heretofore been essential for the recognition of characters.

The count value (segment information) obtained from each of the 4×4 mesh segments by the counting unit 4, is then stored via the subtracting unit 5 into the temporary memory 6 of the read/write type. The subtracting unit 5 performs the operation of subtracting 1 from each of the count values or the segment information when it is greater than 1. Since the maximum possible count value of the 4×4 mesh segments is 16, the subtraction of 1 by the subtracting unit 5 reduces the maximum value to 15 and this value can be represented by a 4-bit binary number.

The fact that the maximum value for the count values of the respective segment information forming an input information is selected 15 and that this maximum value is represented by a 4-bit binary number signifies that in the case of the standard character information set preliminarily prepared in the same information form as the input information for the pattern matching between the input information and the standard character information set, the respective standard segment information of each standard character can also be represented by 4-bit binary numbers with the maximum value being set to 15.

As will be seen from the later description, the standard character information set is stored in the fixed memory 7 for comparison with the input information by the pattern matching technique and in this case the upper limit value $U_{si}$ and the lower limit value $L_{si}$ are predetermined for each of the standard segment information. Since the maximum possible value for the upper limit values $U_{si}$ is 15, in the case of the ROM 7 storing these values $U_{si}$ and $L_{si}$ it is only necessary to have a memory capacity of 8 bits in binary number form per standard segment information. On the other hand, among the ROM devices now on the market the widely used one is of the 8-bit cell per address type. Thus, by using an ROM of the 8-bit depth for the memory 7, it is possible to assign the higher 4 bits to the upper limit value $U_{si}$ and the lower 4 bits to the lower limit value $L_{si}$ so that the reading or writing of each one of the standard segment information of the standard character information can be effected by specifying the corresponding address and the ROM memory bits can be utilized completely with the resulting increase in the utilization efficiency. Moreover the operation of accessing the upper limit value $U_{si}$ and the lower limit value $L_{si}$ can be performed by a single addressing and this proves to be an effective means of improving the recognition processing speed. In the case of this invention, the number of standard segment information of standard character information per character is 40 and consequently it is only necessary to use for the memory 7 an ROM having a memory capacity of 40×8 bits of 40 bytes per character.

On the contrary, in the case of a known system in which a binary coded information of 32×20 bits is represented as a standard character information with one bit as the unit, the memory 7 must have a memory capacity of 32×20=640 bits or 80 bytes per character. In accordance with this invention this memory capacity is reduced to half or 40 bytes. As mentioned previously, in accordance with the invention the counting unit 4 performs its counting by dividing the input character on the basis of 4×4 meshes per segment and the subtracting unit 5 subtracts 1 from the count values which are greater than 1 for the reason of ensuring efficient use of the ROM of the 8-bit depth as mentioned previously. If this fact is not considered and the counting is performed by dividing for example on the basis of 8×8 meshes per segment, the maximum value for the count values of the segment information from the subtracting unit becomes 63 and it is necessary to use 6 bits for representing the number 63 by a binary number, making it necessary to construct the standard information set such that the upper and lower limit values are each represented by 6 bits per segment. 12-bit/address ROMs are available only by a special order, and in the case of the general purpose 8-bit/address ROM the use of bits for two addresses makes it necessary to address twice for reading every standard segment information with the resulting decrease in the recognition processing speed. Moreover, of the eight bits the highest two bits are not utilized thus requiring an excessively large memory capacity. In accordance with this invention the counting unit 4 and the subtracting unit 5 are constructed with a due consideration toward ensuring efficient utilization of the memory and increase in the recognition processing speed.

In the case of the temporary memory 6 storing, one character at a time, the input information as a collection of the segment information (as applied via the subtracting unit), since the maximum value for the count values of the segment information set forming each input information is limited to 15, an RAM organized as 4 bits per address may be used and the memory capacity of 40 bytes per character is sufficient for this RAM since each character consists of 40 segment information.

When the input information is written into the memory 6, under the control of a controller which is not shown, the matching unit 8 performs with a predetermined timing the calculation of a correlation distance Ds between the input information and each member of the standard character information set in the following manner.

As an example of the calculation methods of Ds, the method according to the following formula will now be described.

$$Ds = \sum_i f\{MAX (Lsi - Ii, 0, Ii - Usi)\} \quad (1)$$

In the above formula (1), Usi represents the upper limit value of the ith standard segment information in the standard character information of one character, Lsi the lower limit value of the same ith standard segment information and Ii the count value of the ith segment information of the input information, and $f(x)=x^2$ is used as the function x.

More specifically, the calculation of the correlation distance according to the formula (1) is accomplished as follows. The upper limit value Usi and the lower limit value Lsi of the ith standard segment information in a predetermined standard character information of one character are read from the ROM 7 and then applied, along with the count value Ii of the ith segment information of the input information in the RAM 6, to the arithmetic unit 81 which in turn calculates (Lsi−Ii) and(Ii−Usi). When the results of the calculations are smaller than zero (negative), the zero is selected as the maximum value and a parameter Xi=0 is applied to the function generator 82 which in turn determines $f(Xi)=Xi^2=0$. On the contrary, if the result of (Lsi=Ii) or (Ii−Usi) is greater than zero (positive), this positive result of the two calculations is selected as the maximum value so that the function generator 82 determines $f(Xi)=Xi^2$ in accordance with the parameter Xi. In this way, the function f(Xi) is obtained for each of the 1st to 40th segment information and their total sum is produced by the adder 83 thus calculating the correlation distance $$Ds = \sum_{i=1}^{40} f(Xi).$$

In the above calculation, if the values Ii of all the segment information of the input information are intermediary between the upper limit value Usi and the lower limit value Lsi of all the corresponding standard segment information in the standard character information of one character, the correlation distance Ds is zero. If the values Ii goes beyond the range of the upper and lower limit values, the value of the distance Ds is increased with increase in the difference between these values. In accordance with this invention, the value in the brace of the formula (1) or the value of the parameter Xi is in the range of 0 to 15. While the function is based on $f(Xi)=Xi^2$, in accordance with the present invention the function f(Xi) is limited for example to the value of 100 as shown in the following Table 1 in cases where Xi=10 or over.

TABLE 1

| Xi | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| f(Xi) | 0 | 1 | 4 | 9 | 16 | 25 | 36 | 49 | 64 | 81 | 100 | 100 | 100 | 100 | 100 | 100 |

More specifically, when the parameter Xi is greater than 10, the function f(Xi) is limited to 100, for example, for the following reasons.

Generally, in the case of the characters written or printed by a typewriter or a line printer, there is a frequent occurrence of defective characters which are not printed in part. When such a defective character is to be recognized, if the desired distance Ds is calculated by using the function $f(Xi)=Xi^2$ as such for the parameter Xi, the correlation distance for the standard character information corresponding to the input character becomes exceedingly large. Thus, in accordance with this invention, as will be seen from the characteristic function shown in Table 1, even if the difference value between the corresponding segment information of the input information and the standard character information increases, the maximum value of the correlation distance Dsi between the segment information is limited to 100, for example, and in this way the recognition of any defective character is made possible.

The hardware construction of the function generator 82 for calculating the characteristic function of Table 1 may be implemented by an ROM which receives the parameter Xi as an address information from the unit 81 and in which are stored the values of f(Xi) shown in Table 1. This ROM may comprise an ROM device of the same 8-bit depth as the standard character information storing ROM 7 and the use of its capacity for 16 addresses is sufficient for generating the characteristic function of Table 1. As a result, there is no need to use many expensive multipliers or arithmetic units and it is possible to increase the processing speed and reduce the cost.

The above-mentioned calculation of a distance Ds by the matching unit 8 is performed between the input information of one character detected by the scanner 1 and the all-character standard character information set stored in the memory 7 and the results of the calculations are applied to the decision unit 9.

The decision unit 9 compares the thus determined correlation distances between the input information and the standard character information set with one another and then determines whether the minimum value of the distances, the difference value between the minimum distance value and the next minimum distance value or the like satisfies the preset desired condition, thereby recognizing the input character as that character corresponding to the standard character information which produced the minimum distance or rejecting the input character.

The process of the subtracting unit 5 for subtracting 1 from each of the segment count values which were produced by the counting unit 4 and greater than 1 has another effect as will be described hereunder.

Figure 5:
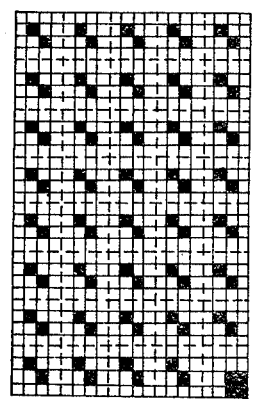
FIG. 5 is a diagram schematically showing the two-dimensional pattern on the storage plane having spot smearings all over.

Generally, it may be presumed that the subtraction of 1 from the count value of each segment tends to destroy the information content of the segment. In accordance with this invention the segment information represents a broad-view property with respect to the stroke width of the character as mentioned previously and the loss of information due to the subtraction of 1 is practically negligible. The process of subtracting 1 rather has the effect of eliminating any spots which are peculiar to printed characters and thus it is possible to serve by the subtracting means alone the same function of spot elimination as done by the preliminary process of the prior art systems. For instance, if the information stored on the plane 10 is smeared with spots all over as shown in FIG. 5, that is, when the space (blank) portion between the characters on the paper 12 is read by the scanner 1, the corresponding standard character information is given by Usi=0, Lsi=0 (i=1 to 40). As a result, the calculation of the distance DS from the formula (1) results in Ds=172 without the subtraction of 1 and it results in Ds=48 with the subtraction of 1. Thus, it is evident that the subtraction of 1 from each of the count values for the segments is effective in reducing the effect of smearing. While FIG. 5 shows the extreme case where the plane 10 is smeared with spots all over, usually expected cases are practically such that spots partially exist in the paper white ground serving as the background of the characters and it will be seen that the detrimental effect of such spots on the recognition process can be effectively reduced only by the subtracting means during the conversion of the character information to the segment information.

What is claimed is:

1. An optical character recognition system comprising:
   first memory means for temporarily storing an input character information read by optical scanning of a printed character on a paper in the form of a digitized data including background digital bits indicative of a paper white background area and character digital bits indicative of a character black data area;
   location normalizing means for normalizing a location occupied by said input character information on a storage plane of said first memory means;
   counting means for dividing said normalized input character information on said storage plane into a plurality of segments each having an area of 4×4 meshes, counting the number of character digital bit indicative meshes in each of said segments and generating the resulting count values as a set of segment information;
   subtracting means for subtracting 1 from each of said count values of said segment information set when the same is greater than 1;
   second memory means for temporarily storing as an input information a collection of said segment information for one character applied via said subtracting means;
   third memory means preliminarily storing permanently a set of standard character information representing a plurality of different characters in the same segment information form as the information form of said input information;
   matching means for performing the process of pattern matching between said input information and each of said set of standard character information; and
   decision means responsive to the result of said pattern matching process to determine whether said printed character is to be recognized as one corresponding to the most matched one of said set of standard character information or the same is to be rejected.

2. A system according to claim 1, wherein each of said set of standard character information for one character comprises a collection of standard segment information each thereof including an upper limit value and a lower limit value, and wherein said matching means calculates a correlation distance between said input information and each of said set of standard character information as a total sum of distances calculated by comparison between corresponding ones of said segment information thereof.

3. A system according to claim 2, wherein the upper limit of said distances calculated by comparison between corresponding ones of said segment information of said input information and each said standard character information is limited to less than a predetermined value.

4. A system according to claim 1, wherein each of said set of standard character information for one character comprises a collection of standard segment information each thereof including an upper limit value and a lower limit value, and wherein said matching means comprises an arithmetic unit for comparing said input information and each said standard character information such that the difference between said upper limit value or lower limit value of each of said standard segment information and each of said segment information is obtained and maximum one of said difference values and zero is generated as a parameter, a function generator responsive to said parameter to generate a predetermined characteristic function, and an adder for producing a sum of said characteristic function values of said segment information for one character to generate a correlation distance between said input information and each said standard character information.

5. A system according to claim 4, wherein said function generator generates $f(X)=X^2$ as said characteristic function corresponding to a parameter X.

6. A system according to claim 4, wherein said function generator comprises a memory device for receiving a parameter X as an address information, said memory device storing as said characteristic function $f(X)=X^2$ for each of said parameters X of values less than a predetermined value and a fixed value for each of said parameters X greater than said predetermined value.

7. A system according to claim 4, wherein each of said plurality of segment information of said input information is represented by a 4-bit binary number, and each of said plurality of standard segment information of each said standard character information is represented by an 8-bit binary number of which four bits are assigned to said upper limit value and another four bits are assigned to said lower limit value.

8. A system according to claim 1, wherein said location normalizing means detects a left end side and an upper end side of said character digital bit area of said input character information on said storage plane and alignes each of said sides with a reference position.

9. A system according to claim 8, wherein said detection is accomplished by using a window of $2\times 2$ mesh area such that said detection is accomplished when all the meshes of said window are occupied by said character digital bits.

10. A system according to claim 1, wherein the storage plane of said first memory means comprises an area of $32\times 20$ bits per character, and wherein the number of said segment information per character is 40.

* * * * *

UNITED STATES PATENT AND TRADEMARK OFFICE
CERTIFICATE OF CORRECTION

PATENT NO. : 4,379,283
DATED : April 5, 1983
INVENTOR(S) : Koji ITO et al

It is certified that error appears in the above—identified patent and that said. Letters Patent is hereby corrected as shown below:

On the title page, after "[73] Assignee" change the assignee's name to --Tokyo Keiki Company Limited--

Signed and Sealed this

Second Day of August 1983

[SEAL]

Attest:

GERALD J. MOSSINGHOFF

Attesting Officer

Commissioner of Patents and Trademarks